US011948584B2

(12) United States Patent
Kordon et al.

(10) Patent No.: US 11,948,584 B2
(45) **Date of Patent: *Apr. 2, 2024**

(54) LAYERED CODING FOR COMPRESSED SOUND OR SOUND FIELD REPRESENTENTATIONS

(71) Applicant: DOLBY INTERNATIONAL AB, Amsterdam (NL)

(72) Inventors: Sven Kordon, Wunstorf (DE); Alexander Krueger, Burgdorf (DE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,492

(22) Filed: May 23, 2022

(65) Prior Publication Data

US 2022/0277753 A1 Sep. 1, 2022

Related U.S. Application Data

(60) Continuation of application No. 16/917,907, filed on Jul. 1, 2020, now Pat. No. 11,373,660, which is a (Continued)

(30) Foreign Application Priority Data

Oct. 8, 2015 (EP) .................................... 15306590

(51) Int. Cl.
*G10L 19/00* (2013.01)
*G10L 19/008* (2013.01)
(Continued)

(52) U.S. Cl.
CPC ............ *G10L 19/008* (2013.01); *G10L 19/24* (2013.01); *H04S 7/00* (2013.01); *G10L 19/167* (2013.01); *H04S 2420/11* (2013.01)

(58) Field of Classification Search
CPC combination set(s) only.
See application file for complete search history.

(56) References Cited

U.S. PATENT DOCUMENTS 7,904,293 B2 3/2011 Wang
8,494,865 B2 7/2013 Fuchs
(Continued)

FOREIGN PATENT DOCUMENTS

CN 102547549 B 7/2012
CN 102160378 B 6/2013
(Continued)

OTHER PUBLICATIONS

Hellerud, E. et al "Spatial Redundancy in Higher Order Ambisonics and Its Use for Low Delay Lossless Compression" IEEE International Conference on Acoustics, Speech and Signal Processing, Apr. 19, 2009, pp. 269-272.

(Continued)

*Primary Examiner* — Vu B Hang

(57) ABSTRACT

The present document relates to a method of layered encoding of a compressed sound representation of a sound or sound field. The compressed sound representation comprises a basic compressed sound representation comprising a plurality of components, basic side information for decoding the basic compressed sound representation to a basic reconstructed sound representation of the sound or sound field, and enhancement side information including parameters for improving the basic reconstructed sound representation. The method comprises sub-dividing the plurality of components into a plurality of groups of components and assigning each of the plurality of groups to a respective one of a plurality of hierarchical layers, the number of groups corresponding to the number of layers, and the plurality of layers including a base layer and one or more hierarchical enhancement layers, adding the basic side information to the base layer, (Continued)

and determining a plurality of portions of enhancement side information from the enhancement side information and assigning each of the plurality of portions of enhancement side information to a respective one of the plurality of layers, wherein each portion of enhancement side information includes parameters for improving a reconstructed sound representation obtainable from data included in the respective layer and any layers lower than the respective layer. The document further relates to a method of decoding a compressed sound representation of a sound or sound field, wherein the compressed sound representation is encoded in a plurality of hierarchical layers that include a base layer and one or more hierarchical enhancement layers, as well as to an encoder and a decoder for layered coding of a compressed sound representation.

4 Claims, 7 Drawing Sheets

Related U.S. Application Data division of application No. 15/763,827, filed as application No. PCT/EP2016/073970 on Oct. 7, 2016, now Pat. No. 10,706,860.

(60) Provisional application No. 62/361,809, filed on Jul. 13, 2016.

(51) Int. Cl.

| | |
|---|---|
| ***G10L 19/24*** | (2013.01) |
| ***H04S 7/00*** | (2006.01) |
| *G10L 19/16* | (2013.01) |

(56) References Cited

U.S. PATENT DOCUMENTS

| | | | |
|---|---|---|---|
| 8,645,145 B2 | 2/2014 | Subbaraman | |
| 10,706,860 B2 * | 7/2020 | Kordon | G10L 19/008 |
| 2007/0208557 A1 | 9/2007 | Li | |
| 2008/0004883 A1 | 1/2008 | Vilermo | |
| 2009/0171672 A1 | 7/2009 | Philippe | |
| 2014/0249827 A1 | 9/2014 | Sen | |
| 2014/0303762 A1 | 10/2014 | Johnson | |
| 2014/0355771 A1 | 12/2014 | Peters | |
| 2015/0098572 A1 | 4/2015 | Krueger | |
| 2015/0213803 A1 | 7/2015 | Peters | |
| 2015/0248889 A1 | 9/2015 | Dickins et al. | |
| 2018/0268827 A1 | 9/2018 | Kordon | |

FOREIGN PATENT DOCUMENTS

| | | | |
|---|---|---|---|
| CN | 104285253 | B | 1/2015 |
| CN | 104285390 | B | 6/2017 |
| CN | 105612577 | B | 10/2019 |
| EP | 2922057 | | 9/2015 |
| EP | 3025329 | B1 | 3/2022 |
| JP | 2006072026 | A | 3/2006 |
| JP | 2013535023 | | 9/2013 |
| RU | 2533437 | C2 | 11/2014 |
| WO | 2010003556 | A1 | 1/2010 |
| WO | 2011086067 | A1 | 7/2011 |
| WO | 2010103854 | | 9/2012 |
| WO | 2014195190 | | 12/2014 |
| WO | 2015/140293 | A1 | 9/2015 |

OTHER PUBLICATIONS

ISO/IEC JTC1/SC29/WG11 23008-3:2015(E). Information technology—High efficiency coding and media delivery in heterogeneous environments—Part 3: 3D audio, Feb. 2015.

ISO/IEC JTC1/SC29/WG11 23008-3:2015/PDAM3. Information technology—High efficiency coding and media delivery in heterogeneous environments—Part 3: 3D audio, Amendment 3: MPEG-H 3D Audio Phase 2, Jul. 2015.

Sen, D. et al."Thoughts on the Scalable/Layered Coding Technology for the HOA Signal" ISO/IEC JTC1/SC29/WG11 MPEG2014/M35160, Oct. 2014, Strasbourg, France.

* cited by examiner

LAYERED CODING FOR COMPRESSED SOUND OR SOUND FIELD REPRESENTENTATIONS

CROSS-REFERENCE TO RELATED APPLICATIONS

This application is continuation of U.S. patent application Ser. No. 16/917,907, filed Jun. 1, 2020, which is a divisional of U.S. patent application Ser. No. 15/763,827, filed Mar. 27, 2018, now U.S. Pat. No. 10,706,860, which is the U.S. National Stage of International Application No. PCT/EP2016/073970, filed Oct. 7, 2016, which claims priority to European Patent Application No. 15306590.9 filed on Oct. 8, 2015 and U.S. Patent Application No. 62/361,809, filed Jul. 13, 2016, each of which is incorporated herein by reference in its entirety.

TECHNICAL FIELD

The present document relates to methods and apparatuses for layered audio coding. In particular, the present document relates to methods and apparatuses for layered audio coding of compressed sound (or sound field) representations, for example Higher-Order Ambisonics (HOA) sound (or sound field) representations.

BACKGROUND

For the streaming of a sound (or sound field) representation over a transmission channel with time-varying conditions, layered coding is a means to adapt the quality of the received sound representation to the transmission conditions, and in particular to avoid undesired signal dropouts.

For layered coding, the sound (or sound field) representation is usually subdivided into a high priority base layer of a relatively small size and additional enhancement layers with decremental priorities and arbitrary sizes. Each enhancement layer is typically assumed to contain incremental information to complement that of all lower layers in order to improve the quality of the sound (or sound field) representation. The amount of error protection for the transmission of the individual layers is controlled based on their priority. In particular, the base layer is provided with a high error protection, which is reasonable and affordable due to its low size.

However, there is a need for layered coding schemes for (extended versions of) special types of compressed representations of sound or sound fields, such as, for example, compressed HOA sound or sound field representations.

The present document addresses the above issues. In particular, methods and encoders/decoders for layered coding of compressed sound or sound field representations are described.

SUMMARY

According to an aspect, a method of layered encoding of a compressed sound representation of a sound or sound field is described. The compressed sound representation may include a basic compressed sound representation that includes a plurality of components. The plurality of components may be complementary components. The compressed sound representation may further include basic side information for decoding the basic compressed sound representation to a basic reconstructed sound representation of the sound or sound field. The compressed sound representation may yet further include enhancement side information including parameters for improving (e.g., enhancing) the basic reconstructed sound representation. The method may include sub-dividing (e.g., grouping) the plurality of components into a plurality of groups of components. The method may further include assigning (e.g., adding) each of the plurality of groups to a respective one of a plurality of hierarchical layers. The assignment may indicate a correspondence between respective groups and layers. Components assigned to a respective layer may be said to be included in that layer. The number of groups may correspond to (e.g., be equal to) the number of layers. The plurality of layers may include a base layer and one or more hierarchical enhancement layers. The plurality of hierarchical layers may be ordered, from the base layer, through the first enhancement layer, the second enhancement layer, and so forth, up to an overall highest enhancement layer (overall highest layer). The method may further include adding the basic side information to the base layer (e.g., including the basic side information in the base layer, or allocating the basic side information to the base layer, for example for purposes of transmission or storing). The method may further include determining a plurality of portions of enhancement side information from the enhancement side information. The method may yet further include assigning (e.g., adding) each of the plurality of portions of enhancement side information to a respective one of the plurality of layers. Each portion of enhancement side information may include parameters for improving a reconstructed (e.g., decompressed) sound representation obtainable from data included in (e.g., assigned or added to) the respective layer and any layers lower than the respective layer. The layered encoding may be performed for purposes of transmission over a transmission channel or for purposes of storing in a suitable storage medium, such as a CD, DVD, or Blu-ray Disc™, for example.

Configured as above, the proposed method enables to efficiently apply layered coding to compressed sound representations comprising a plurality of components as well as first and enhancement side information (e.g., independent basic side information and enhancement side information) having the properties set out above. In particular, the proposed method ensures that each layer includes suitable side information for reconstructing a reconstructed sound representation from the components included in any layers up to the layer in question. Therein the layers up to the layer in question are understood to include, for example, the base layer, the first enhancement layer, the second enhancement layer, and so forth, up to the layer in question. Thus, regardless of an actual highest usable layer (e.g., the layer below the lowest layer that has not been validly received, so that all layers below the highest usable layer and the highest usable layer itself have been validly received), a decoder would be enabled to improve or enhance a reconstructed sound representation, even though the reconstructed sound representation may be different from the complete (e.g., full) sound representation. In particular, regardless of the actual highest usable layer, it is sufficient for the decoder to decode a payload of enhancement side information for only a single layer (i.e., for the highest usable layer) to improve or enhance the reconstructed sound representation that is obtainable on the basis of all components included in layers up to the actual highest usable layer. That is, for each time interval (e.g., frame) only a single payload of enhancement side information has to be decoded. On the other hand, the proposed method allows fully taking advantage of the reduction of required bandwidth that may be achieved when applying layered coding.

In embodiments, the components of the basic compressed sound representation may correspond to monaural signals (e.g., transport signals or monaural transport signals). The monaural signals may represent either predominant sound signals or coefficient sequences of a HOA representation. The monaural signals may be quantized.

In embodiments, the basic side information may include information that specifies decoding (e.g., decompression) of one or more of the plurality of components individually, independently of other components. For example, the basic side information may represent side information related to individual monaural signals, independently of other monaural signals. Thus, the basic side information may be referred to as independent basic side information.

In embodiments, the enhancement side information may represent enhancement side information. The enhancement side information may include prediction parameters for the basic compressed sound representation for improving (e.g., enhancing) the basic reconstructed sound representation that is obtainable from the basic compressed sound representation and the basic side information.

In embodiments, the method may further include generating a transport stream for transmission of the data of the plurality of layers (e.g., data assigned or added to respective layers, or otherwise included in respective layers). The base layer may have highest priority of transmission and the hierarchical enhancement layers may have decremental priorities of transmission. That is, the priority of transmission may decrease from the base layer to the first enhancement layer, from the first enhancement layer to the second enhancement layer, and so forth. An amount of error protection for transmission of the data of the plurality of layers may be controlled in accordance with respective priorities of transmission. Thereby, it can be ensured that at least a number of lower layers is reliably transmitted, while on the other hand reducing the overall required bandwidth by not applying excessive error protection to higher layers.

In embodiments, the method may further include, for each of the plurality of layers, generating a transport layer packet including the data of the respective layer. For example, for each time interval (e.g., frame), a respective transport layer packet may be generated for each of the plurality of layers.

In embodiments, the compressed sound representation may further include additional basic side information for decoding the basic compressed sound representation to the basic reconstructed sound representation. The additional basic side information may include information that specifies decoding of one or more of the plurality of components in dependence on respective other components. The method may further include decomposing the additional basic side information into a plurality of portions of additional basic side information. The method may yet further include adding the portions of additional basic side information to the base layer (e.g., including the portions of additional basic side information in the base layer, or allocating the portions of additional basic side information to the base layer, for example for purposes of transmission or storing). Each portion of additional basic side information may correspond to a respective layer and may include information that specifies decoding of one or more components assigned to the respective layer in dependence (only) on respective other components assigned to the respective layer and any layers lower than the respective layer. That is, each portion of additional basic side information specifies components in the respective layer to which that portion of additional basic side information corresponds without reference to any other components assigned to higher layers than the respective layer.

Configured as such, the proposed method avoids fragmentation of the additional basic side information by adding all portions to the base layer. In other words, all portions of additional basic side information are included in the base layer. The decomposition of the additional basic side information ensures that for each layer a portion of additional basic side information is available that does not require knowledge of components in higher layers. Thus, regardless of an actual highest usable layer, it is sufficient for the decoder to decode additional basic side information included in layers up to the highest usable layer.

In embodiments, the additional basic side information may include information that specifies decoding (e.g., decompression) of one or more of the plurality of components in dependence on other components. For example, the additional basic side information may represent side information related to individual monaural signals in dependence on other monaural signals. Thus, the additional basic side information may be referred to as dependent basic side information.

In embodiments, the compressed sound representation may be processed for successive time intervals, for example time intervals of equal size. The successive time intervals may be frames. Thus, the method may operate on a frame basis, i.e., the compressed sound representation may be encoded in a frame-wise manner. The compressed sound representation may be available for each successive time interval (e.g., for each frame). That is, the compression operation by which the compressed sound representation has been obtained may operate on a frame basis.

In embodiments, the method may further include generating configuration information that indicates, for each layer, the components of the basic compressed sound representation that are assigned to that layer. Thus, the decoder can readily access the information needed for decoding without unnecessary parsing through the received data payloads.

According to another aspect, a method of layered encoding of a compressed sound representation of a sound or sound field is described. The compressed sound representation may include a basic compressed sound representation that includes a plurality of components. The plurality of components may be complementary components. The compressed sound representation may further include basic side information (e.g., independent basic side information) and third information (e.g., dependent basic side information) for decoding the basic compressed sound representation to a basic reconstructed sound representation of the sound or sound field. The basic side information may including information that specifies decoding of one or more of the plurality of components individually, independently of other components. The additional basic side information may include information that specifies decoding of one or more of the plurality of components in dependence on respective other components. The method may include sub-dividing (e.g., grouping) the plurality of components into a plurality of groups of components. The method may further include assigning (e.g., adding) each of the plurality of groups to a respective one of a plurality of hierarchical layers. The assignment may indicate a correspondence between respective groups and layers. Components assigned to a respective layer may be said to be included in that layer. The number of groups may correspond to (e.g., be equal to) the number of layers. The plurality of layers may include a base layer and one or more hierarchical enhancement layers. The method may further include adding the basic side information to the base layer (e.g., including the basic side information in the base layer, or allocating the basic side information to the base layer, for example for purposes of transmission or storing). The method may further include decomposing the additional basic side information into a plurality of portions of additional basic side information and adding the portions of additional basic side information to the base layer (e.g., including the portions of additional basic side information in the base layer, or allocating the portions of additional basic side information to the base layer, for example for purposes of transmission or storing). Each portion of additional basic side information may correspond to a respective layer and include information that specifies decoding of one or more components assigned to the respective layer in dependence on respective other components assigned to the respective layer and any layers lower than the respective layer.

Configured as such, the proposed method ensures that for each layer, appropriate additional basic side information is available for decoding the components included in any layer up to the respective layer, without requiring valid reception or decoding (or in general, knowledge) of any higher layers. In the case of a compressed HOA representation, the proposed method ensures that in vector coding mode a suitable V-vector is available for all component belonging to layers up to the highest usable layer. In particular, the proposed method excludes the case that elements of a V-vector corresponding to components in higher layers are not explicitly signaled. Accordingly, the information included in the layers up to the highest usable layer is sufficient for decoding (e.g., decompressing) any components belonging to layers up to the highest usable layer. Thereby, appropriate decompression of respective reconstructed HOA representations for lower layers is ensured even if higher layers may not have been validly received by the decoder. On the other hand, the proposed method allows fully taking advantage of the reduction of required bandwidth that may be achieved when applying layered coding.

Embodiments of this aspect may relate to the embodiments of the foregoing aspect.

According to another aspect, a method of decoding a compressed sound representation of a sound or sound field is described. The compressed sound representation may have been encoded in a plurality of hierarchical layers. The plurality of hierarchical layers may include a base layer and one or more hierarchical enhancement layers. The plurality of layers may have assigned thereto components of a basic compressed sound representation of a sound or sound field. In other words, the plurality of layers may include the components of the basic compressed side information. The components may be assigned to respective layers in respective groups of components. The plurality of components may be complementary components. The base layer may include basic side information for decoding the basic compressed sound representation. Each layer may include a portion of enhancement side information including parameters for improving a basic reconstructed sound representation obtainable from data included in the respective layer and any layers lower than the respective layer. The method may include receiving data payloads respectively corresponding to the plurality of hierarchical layers. The method may further include determining a first layer index indicating a highest usable layer among the plurality of layers to be used for decoding the basic compressed sound representation to the basic reconstructed sound representation of the sound or sound field. The method may further include obtaining the basic reconstructed sound representation from the components assigned to the highest usable layer and any layers lower than the highest usable layer, using the basic side information. The method may further include determining a second layer index that is indicative of which portion of enhancement side information should be used for improving (e.g., enhancing) the basic reconstructed sound representation. The method may yet further include obtaining a reconstructed sound representation of the sound or sound field from the basic reconstructed sound representation, referring to the second layer index.

Configured as such, the proposed method ensures that the reconstructed sound representation has optimum quality, using the available (e.g., validly received) information to the best possible extent.

In embodiments, the components of the basic compressed sound representation may correspond to monaural signals (e.g., monaural transport signals). The monaural signals may represent either predominant sound signals or coefficient sequences of a HOA representation. The monaural signals may be quantized.

In embodiments, the basic side information may include information that specifies decoding (e.g., decompression) of one or more of the plurality of components individually, independently of other components. For example, the basic side information may represent side information related to individual monaural signals, independently of other monaural signals. Thus, the basic side information may be referred to as independent basic side information.

In embodiments, the enhancement side information may represent enhancement side information. The enhancement side information may include prediction parameters for the basic compressed sound representation for improving (e.g., enhancing) the basic reconstructed sound representation that is obtainable from the basic compressed sound representation and the basic side information.

In embodiments, the method may further include determining, for each layer, whether the respective layer has been validly received. The method may further include determining the first layer index as the layer index of a layer immediately below the lowest layer that has not been validly received.

In embodiments, determining the second layer index may involve either determining the second layer index to be equal to the first layer index, or determining an index value as the second layer index that indicates not to use any enhancement side information when obtaining the reconstructed sound representation. In the latter case, the reconstructed sound representation may be equal to the basic reconstructed sound representation.

In embodiments, the data payloads may be received and processed for successive time intervals, for example time intervals of equal size. The successive time intervals may be frames. Thus, the method may operate on a frame basis. The method may further include, if the compressed sound representations for the successive time intervals can be decoded independently of each other, determining the second layer index to be equal to the first layer index.

In embodiments, the data payloads may be received and processed for successive time intervals, for example time intervals of equal size. The successive time intervals may be frames. Thus, the method may operate on a frame basis. The method may further include, for a given time interval among the successive time intervals, if the compressed sound representations for the successive time intervals cannot be decoded independently of each other, determining, for each layer, whether the respective layer has been validly received. The method may further include determining the first layer index for the given time interval as the smaller one of the first layer index of the time interval preceding the given time interval and the layer index of a layer immediately below the lowest layer that has not been validly received.

In embodiments, the method may further include, for the given time interval, if the compressed sound representations for the successive time intervals cannot be decoded independently of each other, determining whether the first layer index for the given time interval is equal to the first layer index for the preceding time interval. The method may further include, if the first layer index for the given time interval is equal to the first layer index for the preceding time interval, determining the second layer index for the given time interval to be equal to the first layer index for the given time interval. The method may further include, if the first layer index for the given time interval is not equal to the first layer index for the preceding time interval, determining an index value as the second layer index that indicates not to use any enhancement side information when obtaining the reconstructed sound representation.

In embodiments, the base layer may include at least one portion of additional basic side information corresponding to a respective layer and including information that specifies decoding of one or more components among the components assigned to the respective layer in dependence on other components assigned to the respective layer and any layers lower than the respective layer. The method may further include, for each portion of additional basic side information, decoding the portion of additional basic side information by referring to the components assigned to its respective layer and any layers lower than the respective layer. The method may further include correcting the portion of additional basic side information by referring to the components assigned to the highest usable layer and any layers between the highest usable layer and the respective layer. The basic reconstructed sound representation may be obtained from the components assigned to the highest usable layer and any layers lower than the highest usable layer, using the basic side information and corrected portions of additional basic side information obtained from portions of additional basic side information corresponding to layers up to the highest usable layer.

In embodiments, the additional basic side information may include information that specifies decoding (e.g., decompression) of one or more of the plurality of components in dependence on other components. For example, the additional basic side information may represent side information related to individual monaural signals in dependence on other monaural signals. Thus, the additional basic side information may be referred to as dependent basic side information.

According to another aspect, a method of decoding a compressed sound representation of a sound or sound field is described. The compressed sound representation may have been encoded in a plurality of hierarchical layers. The plurality of hierarchical layers may include a base layer and one or more hierarchical enhancement layers. The plurality of layers may have assigned thereto components of a basic compressed sound representation of a sound or sound field. In other words, the plurality of layers may include the components of the basic compressed side information. The components may be assigned to respective layers in respective groups of components. The plurality of components may be complementary components. The base layer may include basic side information for decoding the basic compressed sound representation. The base layer may further include at least one portion of additional basic side information corresponding to a respective layer and including information that specifies decoding of one or more components among the components assigned to the respective layer in dependence on other components assigned to the respective layer and any layers lower than the respective layer. The method may include receiving data payloads respectively corresponding to the plurality of hierarchical layers. The method may further include determining a first layer index indicating a highest usable layer among the plurality of layers to be used for decoding the basic compressed sound representation to the basic reconstructed sound representation of the sound or sound field. The method may further include, for each portion of additional basic side information, decoding the portion of additional basic side information by referring to the components assigned to its respective layer and any layers lower than the respective layer. The method may further include, for each portion of additional basic side information, correcting the portion of additional basic side information by referring to the components assigned to the highest usable layer and any layers between the highest usable layer and the respective layer. The basic reconstructed sound representation may be obtained from the components assigned to the highest usable layer and any layers lower than the highest usable layer, using the basic side information and corrected portions of additional basic side information obtained from portions of additional basic side information corresponding to layers up to the highest usable layer. The method may further comprise determining a second layer index that is either equal to the first layer index or that indicates omission of enhancement side information during decoding.

Configured as such, the proposed method ensures that the additional basic side information that is eventually used for decoding the basic compressed sound representation does not include redundant elements, thereby rendering the actual decoding of the basic compressed sound representation more efficient.

Embodiments of this aspect may relate to the embodiments of the foregoing aspect.

According to another aspect, an encoder for layered encoding of a compressed sound representation of a sound or sound field is described. The compressed sound representation may include a basic compressed sound representation that includes a plurality of components. The plurality of components may be complementary components. The compressed sound representation may further include basic side information for decoding the basic compressed sound representation to a basic reconstructed sound representation of the sound or sound field. The compressed sound representation may yet further include enhancement side information including parameters for improving (e.g., enhancing) the basic reconstructed sound representation. The encoder may include a processor configured to perform some or all of the method steps of the methods according to the first-mentioned above aspect and the second-mentioned above aspect.

According to another aspect, a decoder for decoding a compressed sound representation of a sound or sound field is described. The compressed sound representation may have been encoded in a plurality of hierarchical layers. The plurality of hierarchical layers may include a base layer and one or more hierarchical enhancement layers. The plurality of layers may have assigned thereto components of a basic compressed sound representation of a sound or sound field. In other words, the plurality of layers may include the components of the basic compressed side information. The components may be assigned to respective layers in respective groups of components. The plurality of components may be complementary components. The base layer may include basic side information for decoding the basic compressed sound representation. Each layer may include a portion of enhancement side information including parameters for improving (e.g., enhancing) a basic reconstructed sound representation obtainable from data included in the respective layer and any layers lower than the respective layer. The decoder may include a processor configured to perform some or all of the method steps of the methods according to the third-mentioned above aspect and the fourth-mentioned above aspect.

According to other aspects, methods, apparatuses and systems are directed to decoding a compressed Higher Order Ambisonics (HOA) sound representation of a sound or sound field. The apparatus may have a receiver configured to or the method may receive a bit stream containing the compressed HOA representation corresponding to a plurality of hierarchical layers that include a base layer and one or more hierarchical enhancement layers. The plurality of layers have assigned thereto components of a basic compressed sound representation of the sound or sound field, the components being assigned to respective layers in respective groups of components. The apparatus may have a decoder configured to or the method may decode the compressed HOA representation based on basic side information that is associated with the base layer and based on enhancement side information that is associated with the one or more hierarchical enhancement layers. The basic side information may include basic independent side information related to first individual monaural signals that will be decoded independently of other monaural signals. Each of the one or more hierarchical enhancement layers may include a portion of the enhancement side information including parameters for improving a basic reconstructed sound representation obtainable from data included in the respective layers and any layers lower than the respective layer.

The basic independent side information may indicate that the first individual monaural signals represents a directional signal with a direction of incidence. The basic side information may further include basic dependent side information related to second individual monaural signals that will be decoded dependently of other monaural signals. The basic dependent side information may include vector based signals that are directionally distributed within the sound field, where the directional distribution is specified by means of a vector. The components of the vector are set to zero and are not part of the compressed vector representation.

The components of the basic compressed sound representation may correspond to monaural signals that represent either predominant sound signals or coefficient sequences of an HOA representation. The bit stream includes data payloads respectively corresponding to the plurality of hierarchical layers. The enhancement side information may include parameters related to at least one of: spatial prediction, sub-band directional signals synthesis, and parametric ambience replication. The enhancement side information may include information that allows prediction of missing portions of the sound or sound field from directional signals. There may be further determined, for each layer, whether the respective layer has been validly received and a layer index of a layer immediately below a lowest layer that has not been validly received.

According to another aspect, a software program is described. The software program may be adapted for execution on a processor and for performing some or all of the method steps outlined in the present document when carried out on a computing device.

According to yet another aspect, a storage medium is described. The storage medium may comprise a software program adapted for execution on a processor and for performing some or all of the method steps outlined in the present document when carried out on a computing device.

Statements made with regard to any of the above aspects or its embodiments also apply to respective other aspects or their embodiments, as the skilled person will appreciate. Repeating these statements for each and every aspect or embodiment has been omitted for reasons of conciseness.

The methods and apparatuses including their preferred embodiments as outlined in the present document may be used stand-alone or in combination with the other methods and systems disclosed in this document. Furthermore, all aspects of the methods and apparatus outlined in the present document may be arbitrarily combined. In particular, the features of the claims may be combined with one another in an arbitrary manner.

Method steps and apparatus features may be interchanged in many ways. In particular, the details of the disclosed method can be implemented as an apparatus adapted to execute some or all or the steps of the method, and vice versa, as the skilled person will appreciate.

DESCRIPTION OF THE DRAWINGS

The invention is explained below in an exemplary manner with reference to the accompanying drawings, wherein.

DETAILED DESCRIPTION

Figure 1:
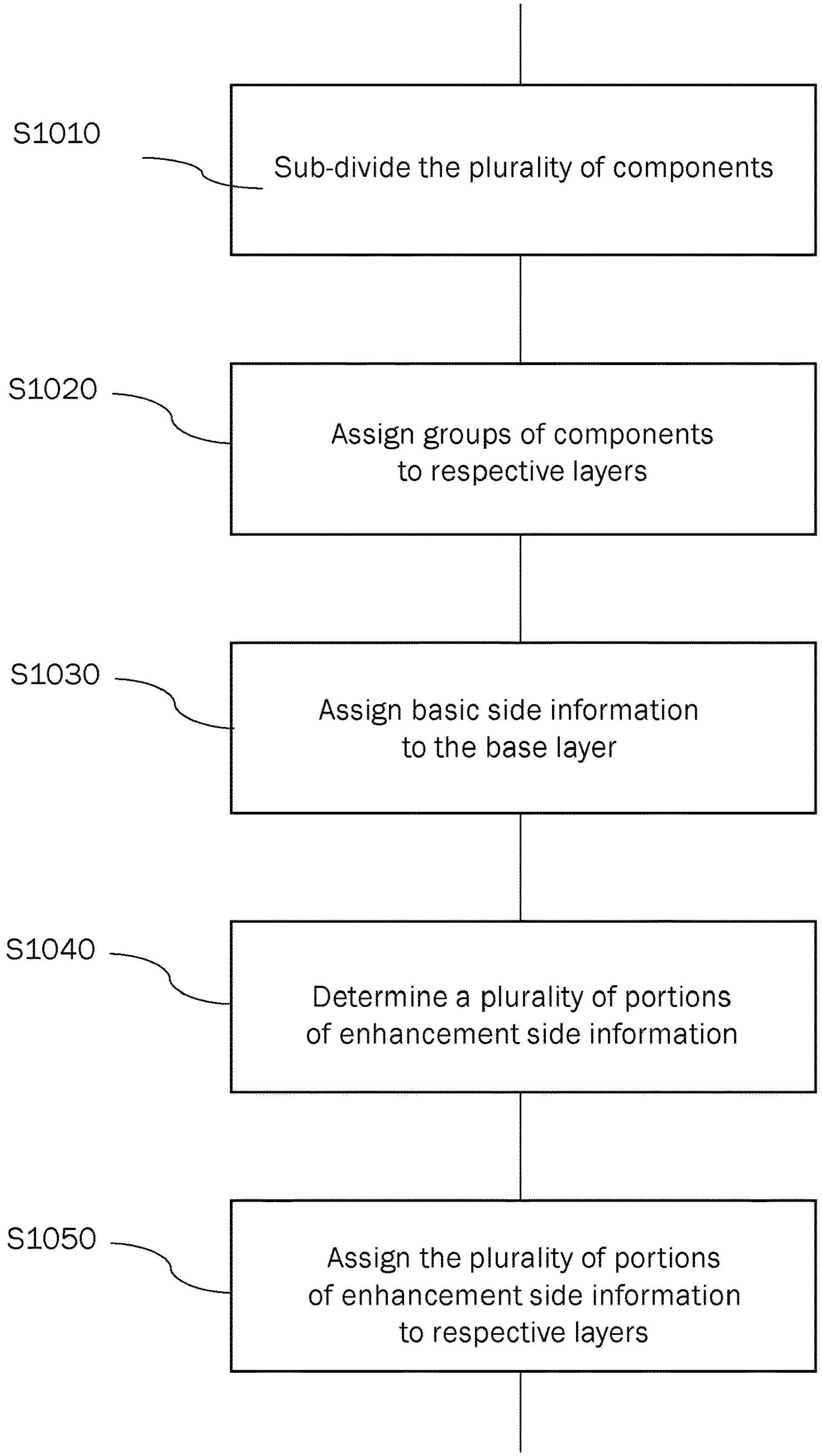
FIG. 1 is a flow chart illustrating an example of a method of layered encoding according to embodiments of the disclosure.

First, a compressed sound (or sound field) representation (henceforth referred to as compressed sound representation for brevity) to which methods and encoders/decoders according to the present disclosure are applicable will be described. In general, the complete compressed sound (or sound field) representation (henceforth referred to as complete compressed sound representation for brevity) may comprise (e.g., consist of) the three following components: a basic compressed sound (or sound field) representation (henceforth referred to as basic compressed sound representation for brevity), basic side information, and enhancement side information.

The basic compressed sound representation itself comprises (e.g., consists of) a number of components (e.g., complementary components). The basic compressed sound representation may account for the distinctively largest percentage of the complete compressed sound representation. The basic compressed sound representation may consist of monaural transport signals representing either predominant sound signals or coefficient sequences of the original HOA representation.

The basic side information is needed to decode the basic compressed sound representation and may be assumed to be of a much smaller size compared to the basic compressed sound representation. It may be made up to its greatest part of disjoint portions, each of which specifies the decompression of only one particular component of the basic compressed sound representation. The basic side information may comprise of a first part that may be known as independent basic side information and a second part that may be known as additional basic side information.

Both the first and second parts, the independent basic side information and the additional basic side information, may specify the decompression of particular components of the basic compressed sound representation. The second part is optional and may be omitted. In this case, the compressed sound representation may be said to comprise the first part (e.g., basic side information).

The first part (e.g., basic side information) may contain side information describing individual (complementary) components of the basic compressed sound representation independently of other (complementary) components. In particular, the first part (e.g., basic side information) may specify decoding of one or more of the plurality of components individually, independently of other components. Thus, the first part may be referred to as independent basic side information.

The second (optional) part may contain side information, also known as additional basic side information, may describe individual (complementary) components of the basic compressed sound representation in dependence to other (complementary) components. This second part may also be referred to as dependent basic side information. In particular, the dependence may have the following properties:

- The dependent basic side information for each individual (complementary) component of the basic compressed sound representation may attain its greatest extent when there are no other certain (complementary) components are contained in the basic compressed sound representation.
- In case that additional certain (complementary) components are added to the basic compressed sound representation, the dependent basic side information for the considered individual (complementary) component may become a subset of the original dependent basic side information, thereby reducing its size.

The enhancement side information is also optional. It may be used to improve or enhance (e.g., parametrically improve or enhance) the basic compressed sound representation. Its size may also be assumed to be much smaller than that of the basic compressed sound representation.

Thus, in embodiments the compressed sound representation may comprise a basic compressed sound representation comprising a plurality of components, basic side information for decoding (e.g., decompressing) the basic compressed sound representation to a basic reconstructed sound representation of the sound or sound field, and enhancement side information including parameters for improving or enhancing (e.g., parametrically improving or enhancing) the basic reconstructed sound representation. The compressed sound representation may further comprise additional basic side information for decoding (e.g., decompressing) the basic compressed sound representation to the basic reconstructed sound representation, which may include information that specifies decoding of one or more of the plurality of components in dependence on respective other components.

One example of such a type of complete compressed sound representation is given by the compressed Higher Order Ambisonics (HOA) sound field representation as specified by the preliminary version of the MPEG-H 3D audio standard (Reference 1), Chapter 12 and Annex C. 5. That is, the compressed sound representation may correspond to a compressed HOA sound (or sound field) representation of a sound or sound field.

For this example, the basic compressed sound field representation (basic compressed sound representation) may comprise (e.g., may be identified with) a number of components. The components may be (e.g., correspond to) monaural signals. The monaural signals may be quantized monaural signals. The monaural signals may represent either predominant sound signals or coefficient sequences of an ambient HOA sound field component.

The basic side information may describe, amongst others, for each of these monaural signals how it spatially contributes to the sound field. For instance, the basic side information may specify a predominant sound signal as a purely directional signal, meaning a general plane wave with a certain direction of incidence. Alternatively, the basic side information may specify a monaural signal as a coefficient sequence of the original HOA representation having a certain index. The basic side information may be further separated into a first part and a second part, as indicated above.

The first part is side information (e.g., independent basic side information) related to specific individual monaural signals. This independent basic side information is independent of the existence of other monaural signals. Such side information may for instance specify a monaural signal to represent a directional signal (e.g., meaning a general plane wave) with a certain direction of incidence. Alternatively, a monaural signal may be specified as a coefficient sequence of the original HOA representation having a certain index. The first part may be referred to as independent basic side information. In general, the first part (e.g., basic side information) may specify decoding of one or more of the plurality of monaural signals individually, independently of other monaural signals.

The second part is side information (e.g., additional basic side information) related to specific individual monaural signals. This side information is dependent on the existence of other monaural signals. Such side information may be utilized, for example, if monaural signals are specified to be vector based signals (see, e.g., Reference 1, Section 12.4.2.4.4). These signals are directionally distributed within the sound field, where the directional distribution may be specified by means of a vector. In a certain mode (see, e.g., CodedVVecLength=1), particular components of this vector are implicitly set to zero and are not part of the compressed vector representation. These components are those with indices equal to those of coefficient sequences of the original HOA representation and part of the basic compressed sound representation. That means that if individual components of the vector are coded, their total number may depend on the basic compressed sound representation. In particular, the total number may depend on which coefficient sequences the original HOA representation contains.

If no coefficient sequences of the original HOA representation are contained in the basic compressed sound representation, the dependent basic side information for each vector-based signal consists of all the vector components and has its greatest size. In case that coefficient sequences of the original HOA representation with certain indices are added to the basic compressed sound representation, the vector components with those indices are removed from the side information for each vector-based signal, thereby reducing the size of the dependent basic side information for the vector-based signals.

The enhancement side information (e.g., enhancement side information) may comprise parameters related to the (broadband) spatial prediction (see Reference 1, Section 12.4.2.4.3) and/or parameters related to the Sub-band Directional Signals Synthesis and the Parametric Ambience Replication.

The parameters related to the (broadband) spatial prediction may be used to (linearly) predict missing portions of the sound field from the directional signals.

The Sub-band Directional Signals Synthesis and the Parametric Ambience Replication are compression tools that were recently introduced into the MPEG-H 3D audio standard with the amendment [see Reference 2, Section 1]. These two tools allow a frequency-dependent parametric-prediction of additional monaural signals to be spatially distributed in order to complement a spatially incomplete or deficient compressed HOA representation. The prediction may be based on coefficient sequences of the basic compressed sound representation.

It is important to note that the aforementioned complementary contribution to the sound field is represented within the compressed HOA representation not by means of additional quantized signals, but rather by means of extra side information of a comparably much smaller size. Hence, the two mentioned coding tools are especially suited for the compression of HOA representations at low data rates.

A second example of a compressed representation of one or more monaural signals with the above-mentioned structure may comprise of coded spectral information for disjoint frequency bands up to a certain upper frequency, which can be regarded as a basic compressed representation; basic side information specifying the coded spectral information (e.g., by the number and width of coded frequency bands); and enhancement side information comprising (e.g., consisting of) parameters of a Spectral Band Replication (SBR), that describe how to parametrically reconstruct from the basic compressed representation the spectral information for higher frequency bands which are not considered in the basic compressed representation.

The present disclosure proposes a method for the layered coding of a complete compressed sound (or sound field) representation having the aforementioned structure.

The compression may be frame based in the sense that it provides compressed representations (in the form of data packets or equivalently frame payloads) for successive time intervals. The time intervals may have equal or different sizes. These data packets may be assumed to contain a validity flag, a value indicating their size as well as the actual compressed representation data. In the following, without intended limitation, it will be assumed that the compression is frame based. Further, unless indicated otherwise and without intended limitation, it will be focused on the treatment of a single frame, and hence the frame index will be omitted.

Each frame payload of the complete compressed sound (or sound field) representation under considertation is assumed to contain J data packets (or frame payloads), each for one component of a basic compressed sound representation, which are denoted by $BSRC_j$, j=1, . . . , J. Further, it is assumed to contain a packet with independent basic side information (basic side information) denoted by $BSI_I$ specifying particular components $BSRC_j$ of the basic compressed sound representation independently of other components. Optionally, it may additionally be assumed to contain a packet with dependent basic side information (additional basic side information) denoted by $BSI_D$ specifying particular components $BSRC_j$ of the basic compressed sound representation in dependence on other components.

The information contained within the two data packets $BSI_I$ and $BSI_D$ may be optionally grouped into one single data packet BSI of basic side information. The single data packet BSI might be said to contain, amongst others, J portions, each of which specifying one particular component $BSRC_j$ of the basic compressed sound representation. Each of these portions in turn may be said to contain a portion of independent side information and, optionally, a portion of depedent side information.

Eventually, it may include an enhancement side information payload (enhancement side information) denoted by ESI with a description of how to improve or enhance the reconstructed sound (or sound field) from the complete basic compressed sound representation.

The proposed solution for layered coding addresses required steps to enable both the compression part including the packing of data packets for transmission as well as the receiver and decompression part. Each part will be described in detail in the following.

First, compression and packing (e.g., for transmission) will be described. In particular, components and elements of the complete compressed sound (or sound field) representation in case of layered coding will be described.

Figure 2:
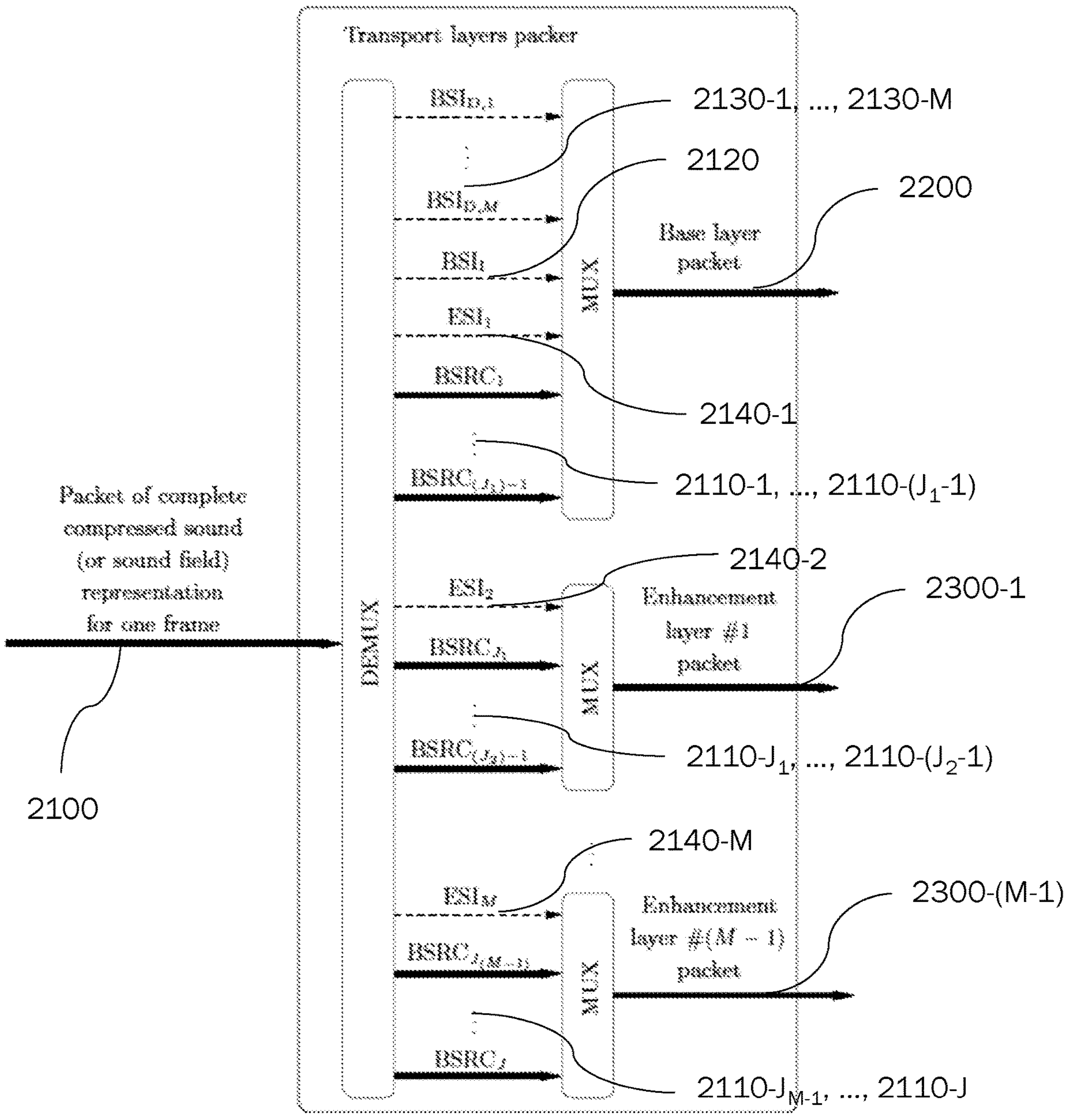
FIG. 2 is a block diagram schematically illustrating an example of an encoder stage according to embodiments of the disclosure.

FIG. 1 schematically illustrates a flowchart of an example of a method for compression and packing (e.g., an encoding method, or a method of layered encoding of a compressed sound representation of a sound or sound field). The assignment (e.g., allocation) of the individual payloads to the base layer and (M−1) enhancement layers may be accomplished by a transport layers packer. FIG. 2 schematically illustrates a block diagram of an example of the assignment/allocation of the individual payloads.

As indicated above, the complete compressed sound representation 2100 may relate for example to a compressed HOA representation comprising a basic compressed sound representation. The complete compressed sound representation 2100 may comprise a plurality of components (e.g., monaural signals) 2110-1, . . . 2110-*J*, independent basic side information (basic side information) 2120, optional enhancement side information (enhancement side information) 2140, and optional dependent basic side information (additional basic side information) 2130. The basic side information 2120 may be information for decoding the basic compressed sound representation to a basic reconstructed sound representation of the sound or sound field. The basic side information 2120 may include information that specifies decoding of one or more components (e.g., monaural signals) individually, independently of other components. The enhancement side information 2140 may include parameters for improving (e.g., enhancing) the basic reconstructured sound representation. The additional basic side information 2130 may be (further) information for decoding the basic compressed sound representation to the basic reconstructed sound representation, and may include information that specifies decoding of one or more of the plurality of components in dependence on respective other components.

FIG. 2 illustrates an underlying assumption where there are a plurality of hierarchical layers, including one base layer (basic layer) and one or more (hierarchical) enhancement layers. For example, there may be M layers in total, i.e. one base layer and M−1 enhancement layers. The plurality of hierarchical layers have a successively increasing layer index. The lowest value of the layer index (e.g., layer index 1) corresponds to the base layer. It is further understood that the layers are ordered, from the base layer, through the enhancement layers, up to the overall highest enhancement layer (i.e., the overall highest layer).

The proposed method may be performed on a frame basis (i.e., in a frame-wise manner). In particular, the compressed sound representation 2100 may be compressed for successive time intervals, for example time intervals of equal size. Each time interval may correspond with a frame. The steps described below may be performed for each successive time interval (e.g., frame).

At S1010 in FIG. 1, the plurality of components 2110 are sub-divided into a plurality of groups of components. Each of the plurality of groups is then assigned (e.g., added, or allocated) to a respective one of a plurality of hierarchical layers. Therein, the number of groups corresponds to the number of layers. For example, the number of groups may be equal to the number of layers, so that there is one group of components for each layer. As indicated above, the plurality of layers may include a base layer and one or more (e.g., M−1) hierarchical enhancement layers.

In other words, the basic compressed sound representation is subdivided into parts to be assigned to the individual layers. Without loss of generality, the grouping can be described by M+1 numbers $J_m$, m=0, . . . , M with $J_0=1$ and $J_M=J+1$ such that components $BSRC_j$ is assigned to the m-th layer for $J_{m-1} \leq j < J_m$.

At S1020, the groups of components are assigned to their respective layers. At S1030, the basic side information 2120 is added (e.g., allocated) to the base layer (i.e., the lowest one of the plurality of hierarchical layers).

That is, due to its small size it is proposed to include the complete basic side information (basic side information and optional additional basic side information) to the base layer to avoid its unnecessary fragmentation.

If the compressed sound representation under consideration comprises dependent basic side information (additional basic side information), the method may further comprise (not shown in FIG. 1) decomposing the additional basic side information into a plurality of portions 2130-1, . . . , 2130-M of additional basic side information. The portions of additional basic side information may then be added (e.g., allocated) to the base layer. In other words, the portions of additional basic side information may be included in the base layer. Each portion of additional basic side information may correspond to a respective layer and may include information that specifies decoding of one or more components assigned to the respective layer in dependence of other components assigned to the respective layer and any layers lower than the respective layer.

Thus, while the independent basic side information $BSI_I$ (basic side information) 2120 is left unchanged for the assignment, the dependent basic side information has to be handled specially for layered coding, in order to allow a correct decoding at the receiver side on the one hand, and to reduce the size of the dependent basic side information to be transmitted on the other hand. It is proposed to decompose the dependent basic side information into M parts (portions) denoted by $BSI_{D,m}$, m=1, . . . , M, where the m-th part contains dependent basic side information for each of the components $BSRC_j$, $J_{-1} \leq j < J_m$, of the basic compressed sound representation assigned to the m-th layer, assuming that the optional dependent basic side information exists for the compressed sound representation under consideration. In case the respective dependent side information does not exist, for the compressed sound representation of parts $BSI_{D\ m}$ may be assumed to be empty. Each part of dependent basic side information $BSI_{D,m}$ may be dependent on all components $BSRC_j$, $1 \leq j < J_m$, contained in all of the layers up to the m-th one, (i.e., contained in all layers j=1, . . . , m).

If the independent basic side information packet $BSI_I$ is of negligibly small size, it is reasonable to keep is as a whole and add (assign) it to the base layer. Optionally, a similar decomposition as for the dependent basic side information can also be done for the independent basic side information, providing the packets $BSI_{I,m}$, m=1, . . . , M. This is useful to reduce the size of the base layer by adding (assigning) parts of the independent basic side information to layers with the corresponding components of the basic compressed sound representation.

At S1040, a plurality of portions 2140-1, . . . , 2140-M of enhancement side information may be determined. Each portion of enhancement side information may include parameters for improving (e.g., enhancing) a reconstructed sound representation obtainable from data included in the respective layer and any layers lower than the respective layer.

The reason for performing this step is that in the case of layered coding it is important to realize that the enhancement side information has to be computed for each layer extra, since it is intended to enhance the preliminary decompressed sound (or sound field), which however is dependent on the available layers for decompression. In particular, the preliminary decompressed sound (or sound field) for a given highest decodable layer (highest usable layer) depends on the components included in the highest decodable layer and any layers below the highest decodable layer. Hence, the compression has to provide M individual enhancement side information data packets (portions of enhancement side information), denoted by $ESI_m$, m=1, . . . , M, where the enhancement side information in the m-th data packet $ESI_m$ is computed such as to enhance the sound (or sound field) representation obtained from all data contained in the base layer and enhancement layers with indices lower than m (e.g., all data contained in the m-th layer and any layers below the m-th layer).

At S1050, the plurality of portions 2140-1, . . . , 2140-M of enhancement side information are assigned (e.g., added, or allocated) to the plurality of layers. Each of the plurality of portions of enhancement side information is assigned to a respective one of the plurality of layers. For example, each of the plurality of layers includes a respective portion of enhancement side information.

The assignment of basic and/or enhancement side information to respective layers may be indicated in configuration information that is generated by the encoding method. In other words, the correspondence between the basic and/or enhancement side information and respective layers may be indicated in the configuration information. Further, the configuration information may indicate, for each layer, the components of the basic compressed sound representation that are assigned to (e.g., included in) that layer. The portions of additional basic side information are included in the base layer, yet may correspond to layers different from the base layer.

Summing up, at the compression stage a frame data packet, denoted by FRAME, is provided that has the following composition:

$$\mathrm{FRAME}=[\mathrm{BSRC}_1 \ldots \mathrm{BSRC}_J \ldots \mathrm{BSI}_I \ldots \mathrm{BSI}_{D,1} \ldots \mathrm{BSI}_{D,M} \ldots \mathrm{ESI}_1 \ldots \mathrm{ESI}_M] \quad (1)$$

Further, the packets $\mathrm{BSI}_I$ and $\mathrm{BSI}_{D,m}$ for m=1, . . . , M might be combined into a single packet BSI, in which case the frame data packet, denoted by FRAME would have the following composition:

$$\mathrm{FRAME}=[\mathrm{BSRC}_1\ \mathrm{BSRC}_2 \ldots \mathrm{BSRC}_J\ \mathrm{BSI}\ \mathrm{ESI}_1\ \mathrm{ESI}_2 \ldots \mathrm{ESI}_M] \quad (2)$$

The ordering of the individual payloads with the frame data packet may generally be arbitrary.

The individual data packets may then be grouped within payloads, which are defined as special data packets that contain a validity flag, a value indicating their size as well as the actual compressed representation data. The usage of payloads allows a simple de-multiplex at the receiver side, offering the advantage of being able to discard obsolete payloads, without the requirement to parse them through. One possible grouping is given by

- assigning (e.g., allocating) each $\mathrm{BSRC}_j$ packet, j=1, . . . , J, to an individual payload denoted $\overline{\mathrm{BP}}_j$.
- assigning (e.g., allocating) the m-th enhancement side information data packet $\mathrm{ESI}_m$ and the m-th dependent side information data packet $\mathrm{BSI}_{D,m}$ to one enhancement payload denoted by $\overline{\mathrm{EP}}_m$, m=1, . . . , M.
- assigning the independent basic side information $\mathrm{BSI}_I$ packet to a separate side information payload denoted by $\overline{\mathrm{BSIP}}$.

Optionally, if the size of the independent basic side information is large, each m-th of its components, $\mathrm{BSI}_{I,m}$, m=1, . . . , M, may be assigned (e.g., allocated) to the enhancement payload $\overline{\mathrm{EP}}_m$. In this case, the side information payload $\overline{\mathrm{BSIP}}$ is empty and can be ignored.

Another option is to assign all dependent basic side information data packets $\mathrm{BSI}_{D,m}$ into the side information payload $\overline{\mathrm{BSIP}}$, which is reasonable if the size of the dependent basic side information is small.

Eventually, a frame data packet, denoted by FRAME, may be provided having the following composition $$\mathrm{FRAME}=[\overline{\mathrm{BP}}_1 \ldots \overline{\mathrm{BP}}_J\ \overline{\mathrm{BSIP}}\ \overline{\mathrm{EP}}_1 \ldots \overline{\mathrm{EP}}_M] \quad (3)$$

The ordering of the individual payloads with the frame data packet may be generally arbitrary.

The method may further comprise (not shown in FIG. 1) generating, for each of the plurality of layers, a transport layer packet (e.g., a base layer packet 2200 and M−1 enhancement layer packets 2300-1, . . . , 2300-(M−1)) including the data of the respective layer (e.g., components, basic side information and enhancement side information for the base layer, or components and enhancement side information for the one or more enhancement layers).

The transport layer packets for different layers may have different priorities of transmission. Thus, the method may further comprise (not shown in FIG. 1), generating a transport stream for transmission of the data of the plurality of layers, wherein the base layer has highest priority of transmission and the hierarchical enhancement layers have decremental priorities of transmission. Therein, higher priority of transmission may correspond to a greater extent of error protection, and vice versa.

Unless steps require certain other steps as prerequisites, the aforementioned steps may be performed in any order and the exemplary order illustrated in FIG. 1 is understood to be non-limiting.

Figure 3:
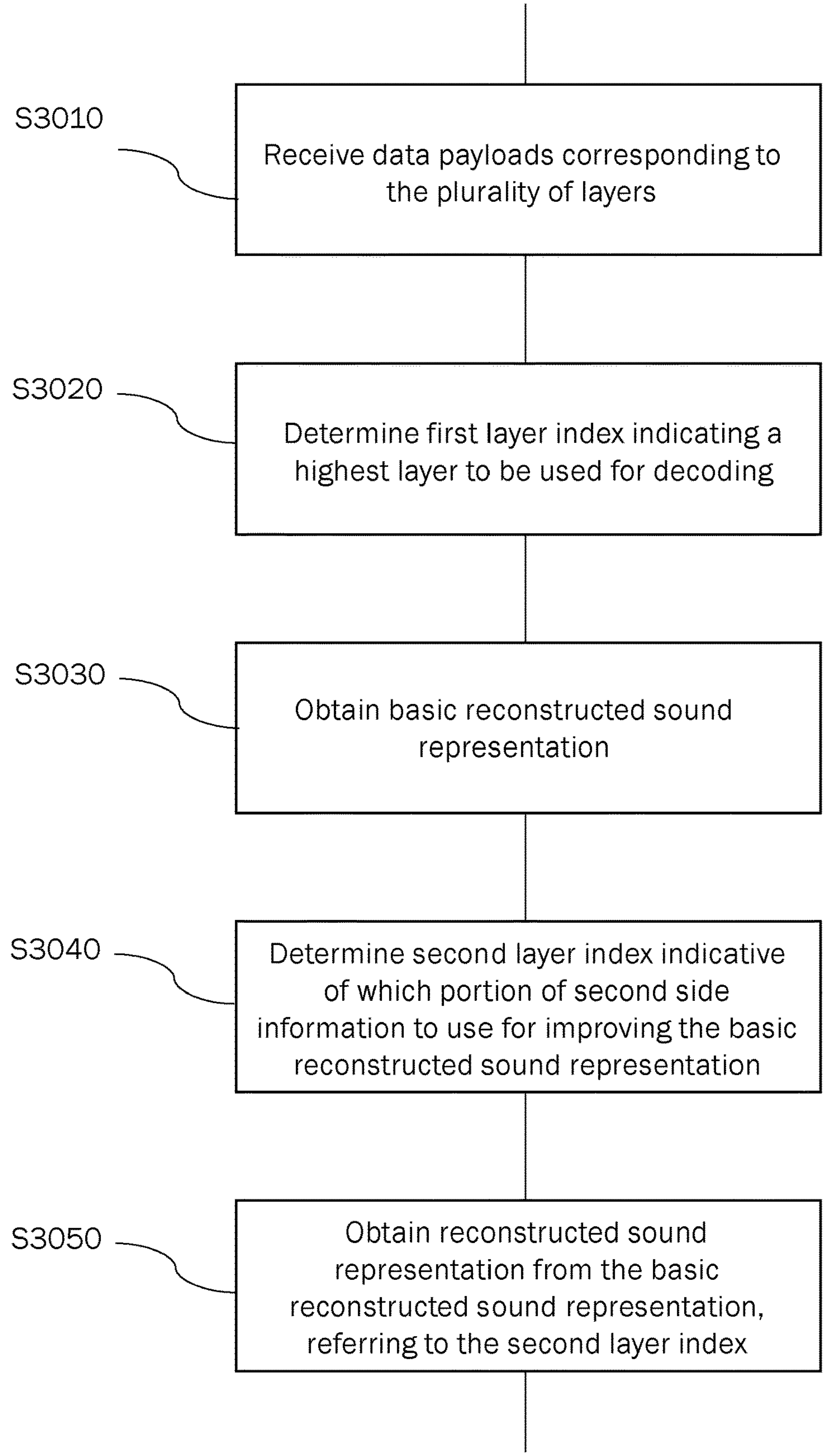
FIG. 3 is a flow chart illustrating an example of a method of decoding a compressed sound representation of a sound or sound field that has been encoded to a plurality of hierarchical layers, according to embodiments of the disclosure.
Figure 4A:
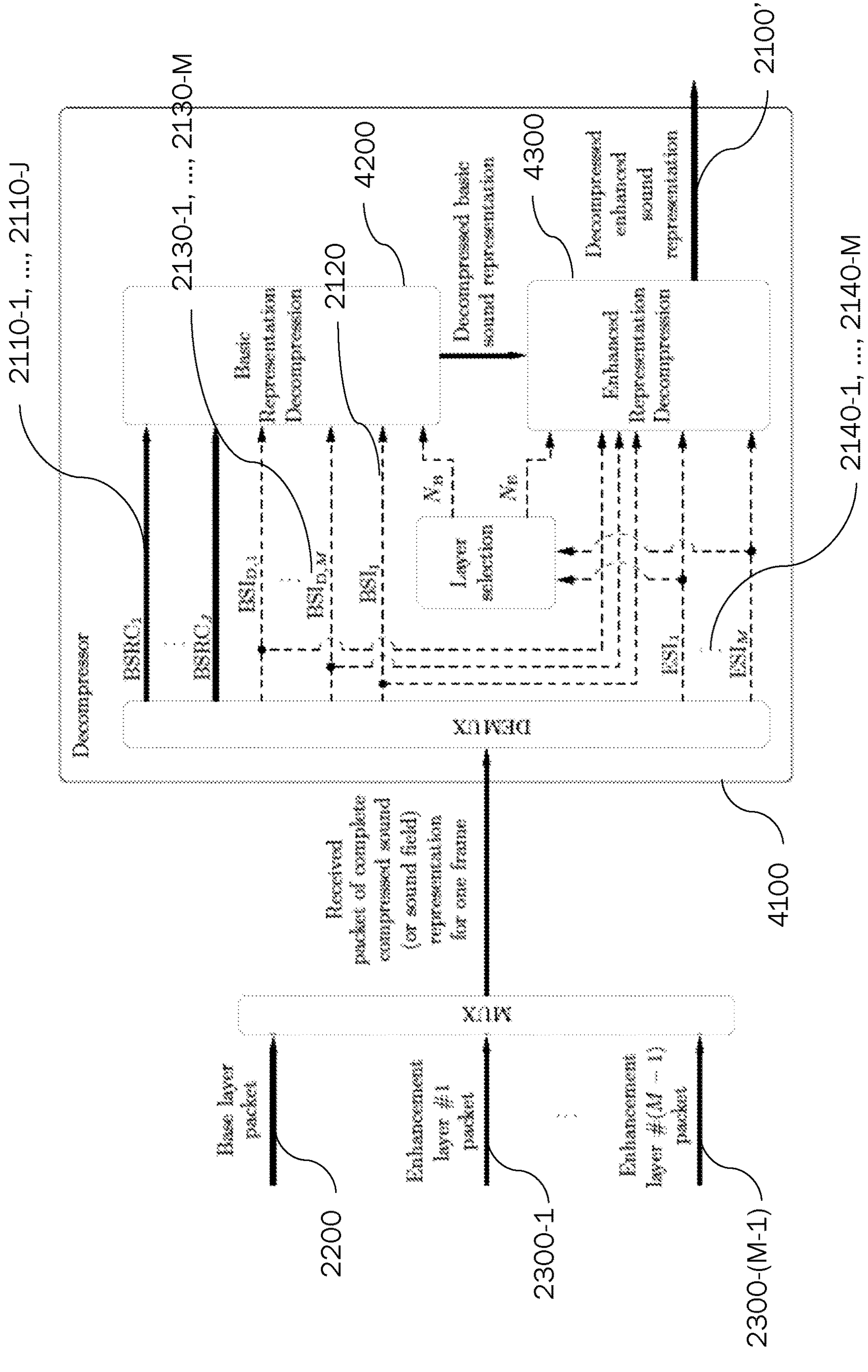
FIG. 4A and FIG. 4B are block diagrams schematically illustrating examples of a decoder stage according to embodiments of the disclosure.
Figure 4B:
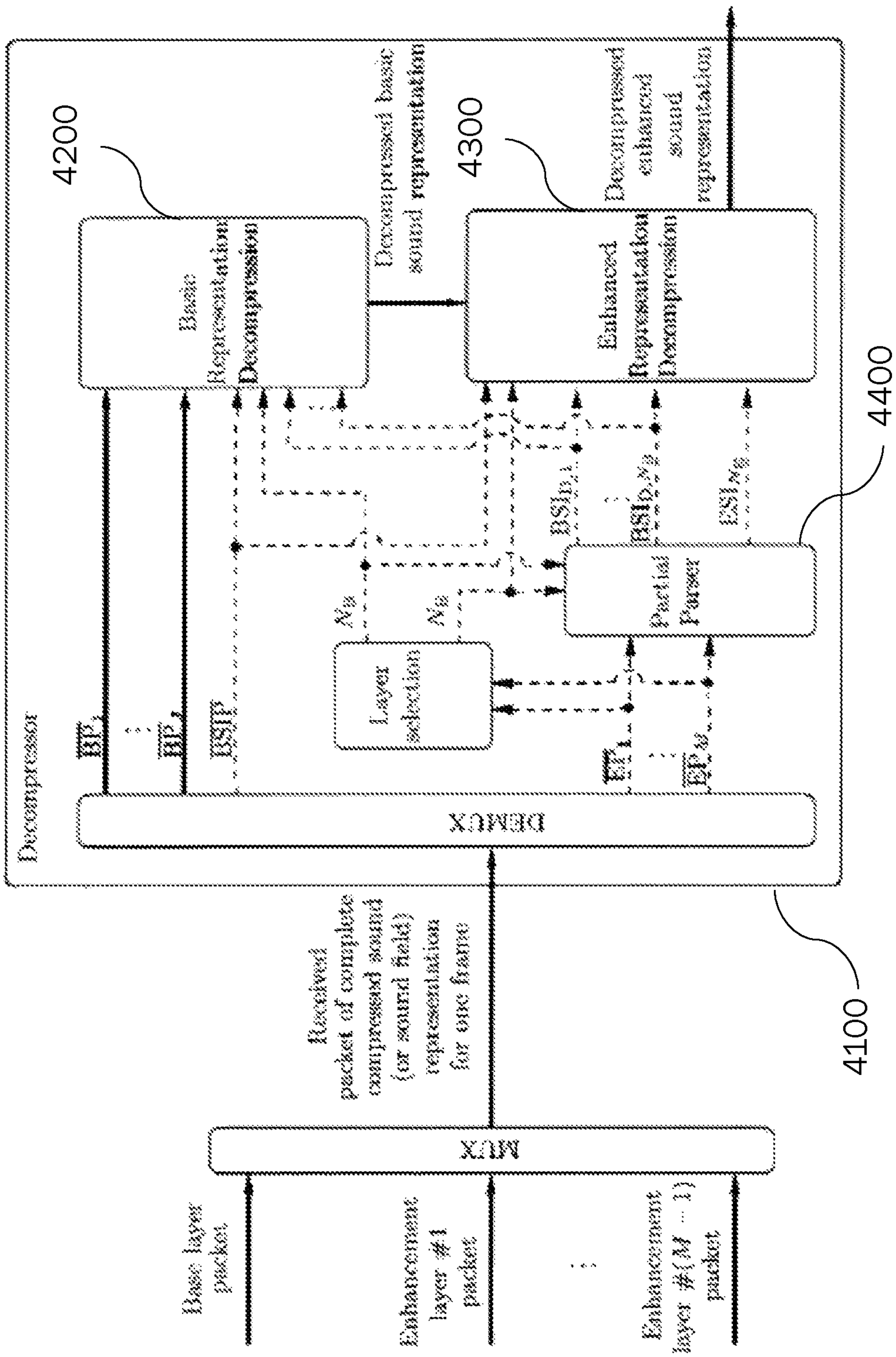

FIG. 3 illustrates a method of decoding a compressed sound representation of a sound or sound field) for decoding or decompression (unpacking). Examples of the corresponding receiver and decompression stage are schematically illustrated in the block diagrams of FIG. 4A and FIG. 4B.

As follows from the above, the compressed sound representation may be encoded in the plurality of hierarchical layers. The plurality of layers may have assigned thereto (e.g., may include) the components of the basic compressed sound representation, the components being assigned to respective layers in respective groups of components. The base layer may include the basic side information for decoding the basic compressed sound representation. Each layer may include one of the aforementioned portions of enhancement side information including parameters for improving a basic reconstructed sound representation obtainable from data included in the respective layer and any layers lower than the respective layer.

The proposed method may be performed on a frame basis (i.e., in a frame-wise manner). In particular, a restored representation of the sound or sound field may be generated for successive time intervals, for example time intervals of equal size. The time intervals may be frames, for example. The steps described below may be performed for each successive time intervals (e.g., frames).

At S3010, data payloads (e.g., transport layer packets) corresponding to the plurality of layers are received. The data payloads may be received as part of a bitstream that contains the compressed HOA representation of a sound or a sound field, the representation corresponding to the plurality of hierarchical layers. The hierarchical layers include a base layer and one or more hierarchical enhancement layers. The plurality of layers have assigned thereto components of a basic compressed sound representation of the sound or sound field. The components are assigned to respective layers in respective groups of components.

The individual layer packets may be multiplexed to provide the received frame packet of the complete compressed sound representation. The received frame packet may be indicated by $$[\mathrm{BSI}_I\ \mathrm{BSI}_{D,1} \ldots \mathrm{BSI}_{D,M}\ \mathrm{ESI}_1\ \mathrm{BSRC}_1 \ldots \mathrm{BSRC}_{(J_1)-}1 \ldots \mathrm{ESI}_M\ \mathrm{BSRC}_{J_{(M-}}1) \ldots \mathrm{BSRC}_j] \quad (4)$$

In the alternate case of the packets $\mathrm{BSI}_I$ and $\mathrm{BSI}_{D,m}$ for m=1, . . . , M being combined into a single packet BSI, the individual layer packets may be multiplexed to provide the received frame packet of the complete compressed sound representation indicated by $$[\mathrm{BSI}\ \mathrm{ESI}_1\ \mathrm{BSRC}_1 \ldots \mathrm{BSRC}_{(J_1)-}1 \ldots \mathrm{ESI}_M\ \mathrm{BSRC}_{J_{(M-}}1) \ldots \mathrm{BSRC}_j] \quad (5)$$

In terms of payloads, the received frame packet may be given by $$\mathrm{FRAME}=[\overline{\mathrm{BP}}_1 \ldots \overline{\mathrm{BP}}_J\ \overline{\mathrm{BSIP}}\ \overline{\mathrm{EP}}_1 \ldots \overline{\mathrm{EP}}_M] \quad (6)$$

The received frame packet may then be passed to a decompressor or decoder 4100. If the transmission of an individual layer has been error-free, the validity flag of at least the contained enhancement side information payload $\overline{\mathrm{EP}}_m$ (e.g., corresponding to a portion of enhancement side information) portion is set to "true". In case of an error due to transmission of an individual layer the validity flag within at least the enhancement side information payload in this layer is set to "false". Hence, the validity of a layer packet can be determined from the validity of the contained enhancement side information payload (e.g., from its validity flag).

In the decompressor 4100, the received frame packet may be de-multiplexed. For this purpose, the information about the size of each payload may be exploited to avoid unnecessary parsing through the data of the individual payloads.

At S3020, a first layer index indicating a highest layer (e.g., highest usable layer, or highest decodable layer) is determined from among the plurality of layers to be used for decoding the basic compressed sound representation to the basic reconstructed sound representation of the sound or sound field.

Moreover, at S3020, there may be selected the value (e.g., layer index) $N_B$ of the highest layer (highest usable layer) that will be used for decompression of the basic sound representation. The highest enhancement layer to be actually used for decompression of the basic sound representation is given by $N_B-1$. Since each layer contains exactly one enhancement side information payload (portion of enhancement side information), it may be determined based on the enhancement side information payload whether or not the containing layer is valid (e.g., has been validly received). Hence, the selection can be accomplished using all enhancement side information payloads $ESI_m$, m=1, . . . , M (or correspondingly, $\overline{EP}_m$, m=1, . . . , M).

At S3030, a basic reconstructed sound representation is obtained. The basic reconstructed sound representation may be obtained from components assigned to the highest usable layer indicated by the first layer index and any layers lower than this highest usable layer, using the basic side information (or in general, using the basic side information).

The payloads of the basic compressed sound representation components $BSRC_1$, . . . , $BSRC_J$ may be provided, along with (all of) the basic side information payloads (e.g., BSI or $BSI_I$ and $BSI_{D,m}$, m=1, . . . , M) and the value $N_B$, to a Basic Representation Decompression processing unit 4200. The Basic Representation Decompression processing unit 4200 (illustrated in FIGS. 4A and 4B), reconstructs the basic sound (or sound field) representation using only those basic compressed sound representation components contained within the lowest $N_B$ layers, that is the base layer and $N_B-1$ enhancement layers (i.e., the layers up to the layer indicated by the first layer index). Alternatively, only the payloads of the basic compressed sound representation components contained in the lowest $N_B$ layers together with respective basic side information payloads may be provided to the Basic Representation Decompression processing unit 4200.

The required information about which components of the basic compressed sound (or sound field) representation are contained in the individual layers is assumed to be known to the decompressor 4100 from a data packet with configuration information, which is assumed to be sent and received before the frame data packets.

In order to provide the dependent side information data packets $BSI_{D,m}$, m=1, . . . , $N_B$ and the enhancement side information data packet $ESI_{N_E}$, all enhancement payloads may be input to a partial parser 4400 (see FIG. 4B) of the decompressor 4100 together with the value $N_E$ and the value $N_B$. The parser may discard all payloads and data packets that will not be used for actual decompression. If the value of $N_E$ is equal to zero, all enhancement side information data packets may be assumed to be empty.

If the base layer includes at least one dependent basic side information payload (portion of additional basic side information) corresponding to a respective layer, the decoding of each individual dependent basic side information payload (e.g., $BSI_{D,m}$, m=1, . . . , $N_B$ (portion of additional basic side information)) may include (i) decoding the portion of additional basic side information by referring to the components assigned to its respective layer and any layers lower than the respective layer (preliminary decoding), and (ii) correcting the portion of additional basic side information by referring to the components assigned to the highest usable layer and any layers between the highest usable layer and the respective layer (correction). Therein, the additional basic side information corresponding to a respective layer includes information that specifies decoding of one or more components among the components assigned to the respective layer in dependence on other components assigned to the respective layer and any layers lower than the respective layer.

Then, the basic reconstructed sound representation can be obtained (e.g., generated) from the components assigned to the highest usable layer and any layers lower than the highest usable layer, using the basic side information and corrected portions of additional basic side information obtained from portions of additional basic side information corresponding to layers up to the highest usable layer.

In particular, the preliminary decoding of each payload $BSI_{D,m}$, m=1, . . . ,$N_B$, may involve exploiting its dependence on the first $J_m-1$ basic compressed sound representation components $BSRC_1$, . . . , $BSRC_{(J_m)-1}$ contained in the first m layers, which was assumed at the encoding stage.

The successive correction of each payload $BSI_{D,m}$, m=1, . . . , $N_B$, may involve considering that the basic sound component is finally reconstructed from the first $J_{N_B}-1$ basic compressed sound representation components $BSRC_1$, . . . , $$BSRC_{(J_{N_B})-1}$$

contained in the first $N_B$>m layers, which are more components than assumed for the preliminary decoding. Hence, the correction may be accomplished by discarding obsolete information, which is possible due to the initially assumed property of the dependent basic side information that if certain complementary components are added to the basic compressed sound representation, the dependent basic side information for each individual (complementary) component becomes a subset of the original one.

At S3040, a second layer index may be determined. The second layer index may indicate the portion(s) of enhancement side information that should be used for improving (e.g., enhancing) the basic reconstructed sound representation.

In addition to the first layer index, there may be determined an index (second layer index) $N_E$ of the enhancement side information payload (portion of second enhancement information) to be used for decompression. The second layer index $N_E$ may always either be equal to the first layer index $N_B$ or equal to zero. The enhancement may be accomplished either always in accordance to the basic sound representation obtained from the highest usable layer, or not at all.

At S3050, a reconstructed sound representation of the sound or sound field is obtained (e.g., generated) from the basic reconstructed sound representation, referring to the second layer index.

That is, the reconstructed sound representation is obtained by (parametrically) improving or enhancing the basic reconstructed sound representation, such as by using the enhancement side information (portion of enhancement side information) indicated by the second layer index. As indicated further below, the second layer index may indicate not to use any enhancement side information at all at this stage. Then, the reconstructed sound representation would correspond to the basic reconstructed sound representation.

For this purpose, the reconstructed basic sound representation together with all enhancement side information payloads $ESI_1, \ldots, ESI_M$, the basic side information payloads (e.g., BSI or $BSI_I$ and $BSI_{D,m}$, m=1, . . . , M), and the value $N_E$ is provided to an Enhanced Representation Decompression processing unit 4300 (illustrated in FIGS. 4A and 4B), which computes the final enhanced sound (or sound field) representation 2100' using only the enhancement side information payload $ESI_{N_E}$ and discarding all other enhancement side information payloads. Alternatively, only the enhancement side information payload $ESI_{N_E}$, instead of all enhancement side information payloads, may be provided to the Enhanced Representation Decompression processing unit 4300. If the value of $N_E$ is equal to zero, all enhancement side information payloads are discarded (or alternatively, no enhancement side information payload is provided) and the reconstructed final enhanced sound representation 2100' is equal to the reconstructed basic sound representation. The enhancement side information payload $ESI_{N_E}$ may have been optained by the partial parser 4400.

FIG. 3 also generally illustrates decoding the compressed HOA representation based on basic side information that is associated with the base layer and based on enhancement side information that is associated with the one or more hierarchical enhancement layers.

Unless steps require certain other steps as prerequisites, the aforementioned steps may be performed in any order and the exemplary order illustrated in FIG. 3 is understood to be non-limiting.

Next, details of the layer selection for decompression (selection of the first and second layer indices) at steps S3020 and S3040 will be described.

Determining the first layer index may involve determining, for each layer, whether the respective layer has been validly received. Determining the first layer index may further involve determining the first layer index as the layer index of a layer immediately below the lowest layer that has not been validly received. Whether or not a layer has been validly received may be determined by evaluating whether the enhancement side information payload of that layer has been validly received. This in turn may be done by evaluating the validity flags within the enhancement side information payloads.

Determining the second layer index may generally involve either determining the second layer index to be equal to the first layer index, or determining an index value as the second layer index (e.g., index value 0) that indicates not to use any enhancement side information when obtaining the reconstructed sound representation.

In the case that all frame data packets may be decompressed independently of each other, both the number $N_B$ of the highest layer (highest usable layer) to be actually used for decompression of the basic sound representation and the index $N_E$ of the enhancement side information payload to be used for decompression may be set to highest number L of a valid enhancement side information payload, which itself may be determined by evaluating the validity flags within the enhancement side information payloads. By exploiting the knowledge of the size of each enhancement side information payload, a complicated parsing through the actual data of the payloads for the determination of their validity can be avoided.

That is, the second layer index may be determined to be equal to the first layer index if the compressed sound representations for the successive time intervals can be decoded independently. In this case, the reconstructed basic sound representation may be enhanced based on the enhancement side information payload of the highest usable layer.

In case that differential decompression with inter-frame dependencies is employed, the decision from the previous frame has to be considered in addition. Note that with differential decompression usually independent frame data packets are transmitted at regular time intervals in order to allow starting the decompression from these time instants, where the determination of the values $N_B$ and $N_E$ becomes frame independent and is carried out as described above.

To explain the proposed frame dependent decision in detail, the highest number (e.g., layer index) of a valid enhancement side information payload for a k-th frame is denoted by by L(k), the highest layer number (e.g., layer index) to be selected and used for decompression of the basic sound representation by $N_B(k)$, and the number (e.g., layer index) of the enhancement side information payload to be used for decompression by $N_E(k)$.

Using this notation, the highest layer number to be used for decompression of the basic sound representation by $N_B(k)$ may be computed according to $$N_B(k)=\min(N_B(k-1), L(k)). \tag{7}$$

By choosing $N_B(k)$ not be greater than $N_B(k-1)$ and L(k) it is ensured that all information required for differential decompression of the basic sound representation is available.

That is, if the compressed sound representations for the successive time intervals (e.g., frames) cannot be decoded independently of each other, determining the first layer index may comprise determining, for each layer, whether the respective layer has been validly received, and determining the first layer index for the given time interval as the smaller one of the first layer index of the time interval preceding the given time interval and the layer index of a layer immediately below the lowest layer that has not been validly received.

The number $N_E(k)$ of the enhancement side information payload to be used for decompression may be determined according to $$N_E(k) = \begin{cases} N_B(k) & \text{if } N_B(k) = N_B(k-1) \\ 0 & \text{else} \end{cases}. \tag{8}$$

Therein, the choice of 0 for $N_E(k)$ indicates that the reconstructed basic sound representation is not to be improved or enhanced using enhancement side information.

This means in particular that as long as the highest layer number $N_B(k)$ to be used for decompression of the basic sound representation does not change, the same corresponding enhancement layer number is selected. However, in case of a change of $N_B(k)$, the enhancement is disabled by setting $N_E(k)$ to zero. Due to the assumed differential decompression of the enhancement side information, its change according to $N_B(k)$ is not possible since it would require the decompression of the corresponding enhancement side information layer at the previous frame which is assumed to not have been carried out.

That is, if the compressed sound representations for the successive time intervals (e.g., frames) cannot be decoded independently of each other, determining the second layer index may comprise determining whether the first layer index for the given time interval is equal to the first layer index for the preceding time interval. If the first layer index for the given time interval is equal to the first layer index for the preceding time interval, the second layer index for the given time interval may be determined (e.g., selected) to be equal to the first layer index for the given time interval. On the other hand, if the first layer index for the given time interval is not equal to the first layer index for the preceding time interval, an index value may be determined (e.g., selected) as the second layer index that indicates not to use any enhancement side information when obtaining the reconstructed sound representation.

Alternatively, if at decompression all of the enhancement side information payloads with numbers up to $N_E(k)$ are decompressed in parallel, the selection rule in Equation (4) can be replaced by $$N_E(k)=N_B(k). \quad (9)$$

Finally note that for differential decompression the number of the highest used layer $N_B$ can only increase at independent frame data packets, whereas a decrease is possible at every frame.

Figure 5:
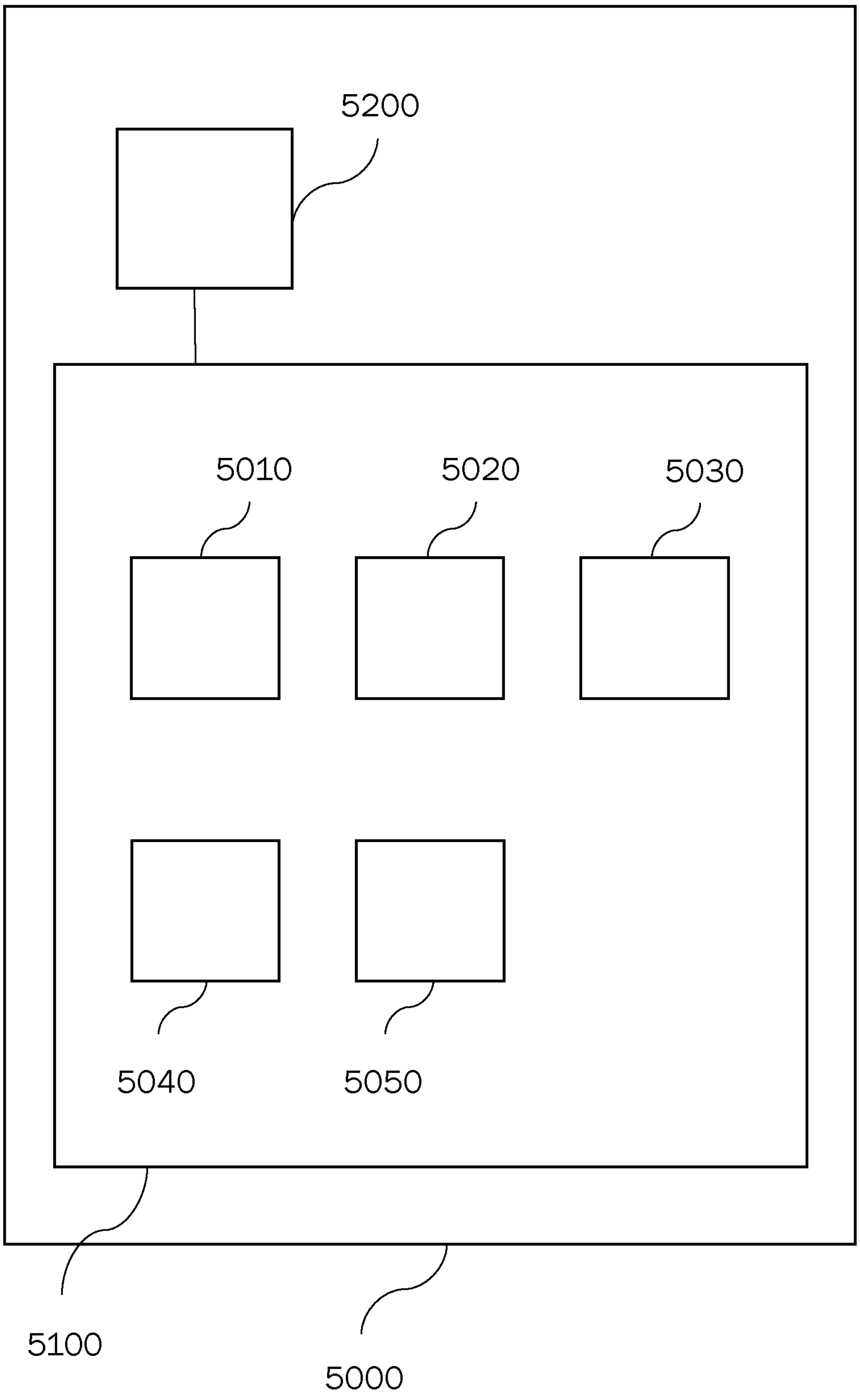
FIG. 5 is a block diagram schematically illustrating an example of a hardware implementation of an encoder according to embodiments of the disclosure.

It is understood that the proposed method of layered encoding of a compressed sound representation may be implemented by an encoder for layered encoding of a compressed sound representation. Such encoder may comprise respective units adapted to carry out respective steps described above. An example of such encoder 5000 is schematically illustrated in FIG. 5. For instance, such encoder 5000 may comprise a component sub-dividing unit 5010 adapted to perform aforementioned S1010, a component assignment unit 5020 adapted to perform aforementioned S1020, a basic side information assignment unit 5030 adapted to perform aforementioned S1030, an enhancement side information partitioning unit 5040 adapted to perform aforementioned S1040, and an enhancement side information assignment unit 5050 adapted to perform aforementioned S1050. It is further understood that the respective units of such encoder may be embodied by a processor 5100 of a computing device that is adapted to perform the processing carried out by each of said respective units, i.e. that is adapted to carry out some or all of the aforementioned steps, as well as any further steps of the proposed encoding method. The encoder or computing device may further comprise a memory 5200 that is accessible by the processor 5100.

Figure 6:
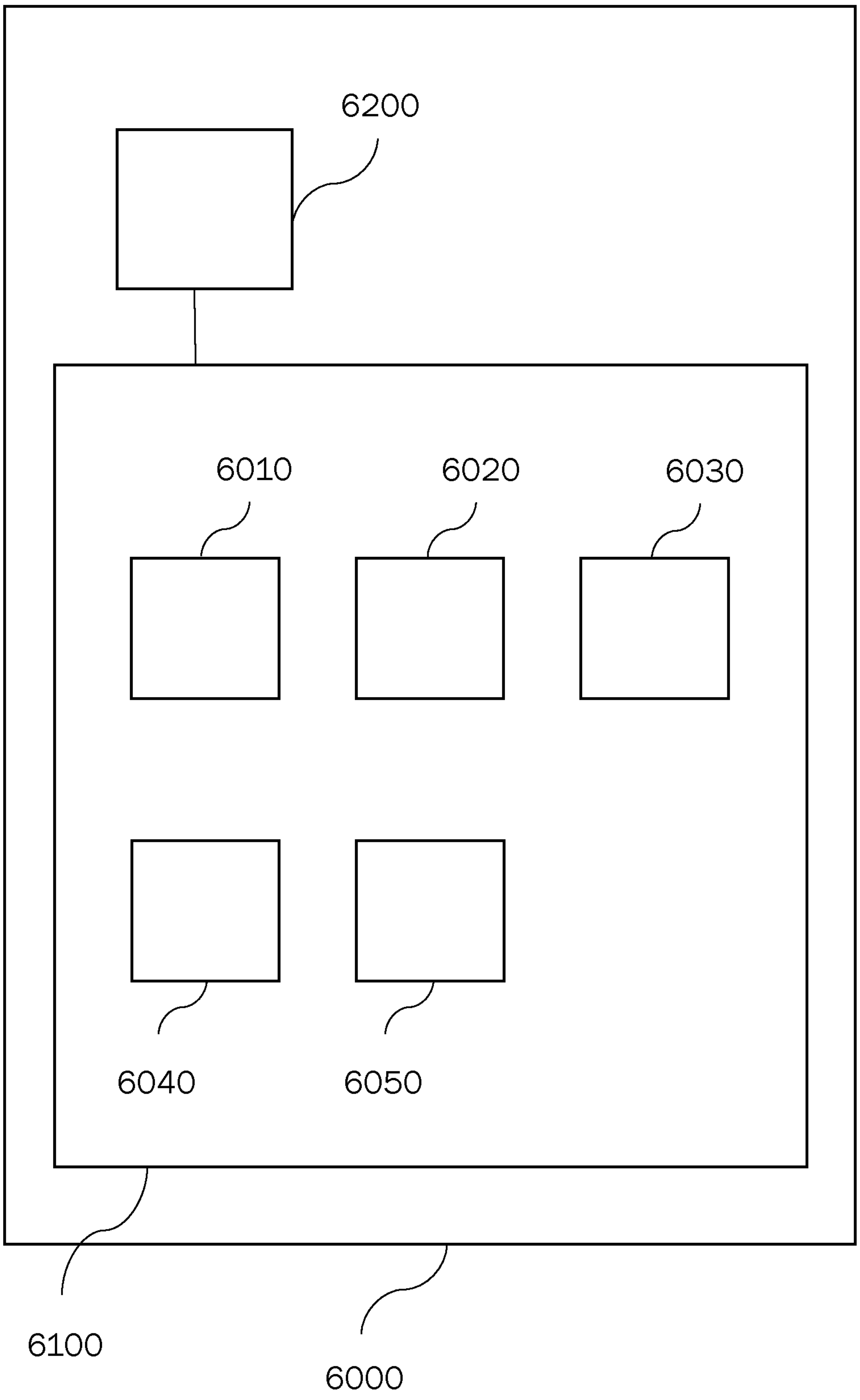
FIG. 6 is a block diagram schematically illustrating an example of a hardware implementation of a decoder according to embodiments of the disclosure.

It is further understood that the proposed method of decoding a compressed sound representation that is encoded in a plurality of hierarchical layers may be implemented by a decoder for decoding a compressed sound representation that is encoded in a plurality of hierarchical layers. Such decoder may comprise respective units adapted to carry out respective steps described above. An example of such decoder 6000 is schematically illustrated in FIG. 6. For instance, such decoder 6000 may comprise a reception unit 6010 adapted to perform aforementioned S3010, a first layer index determination unit 6020 adapted to perform aforementioned S3020, a basic reconstruction unit 6030 adapted to perform aforementioned S3030, a second layer index determination unit 6040 adapted to perform aforementioned S3040, and an enhanced reconstruction unit 6050 adapted to perform aforementioned S3050. It is further understood that the respective units of such decoder may be embodied by a processor 6100 of a computing device that is adapted to perform the processing carried out by each of said respective units, i.e. that is adapted to carry out some or all of the aforementioned steps, as well as any further steps of the proposed decoding method. The decoder or computing device may further comprise a memory 6200 that is accessible by the processor 6100.

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods and apparatus described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and apparatus may be stored on media such as random access memory or optical storage media. They may be transferred via networks, such as radio networks, satellite networks, wireless networks or wireline networks, e.g. the Internet.

Reference 1: ISO/IEC JTC1/SC29/WG11 23008-3:2015 (E). Information technology—High efficiency coding and media delivery in heterogeneous environments—Part 3: 3D audio, February 2015.

Reference 2: ISO/IEC JTC1/SC29/WG11 23008-3:2015/PDAM3. Information technology—High efficiency coding and media delivery in heterogeneous environments—Part 3: 3D audio, AMENDMENT 3: MPEG-H 3D Audio Phase 2, July 2015.

What is claimed:

1. A method of decoding a compressed Higher Order Ambisonics (HOA) representation of a sound or sound field, the method comprising:

receiving a bit stream containing the compressed HOA representation, wherein the bit stream comprises a plurality of hierarchical layers that include a base layer and two or more hierarchical enhancement layers, wherein the bit stream comprises at least a data payload corresponding to the plurality of hierarchical layers, and wherein the bit stream further comprises basic side information that is associated with the base layer and enhancement side information that is associated with the two or more hierarchical enhancement layers, wherein the plurality of hierarchical layers have assigned thereto components of the compressed HOA representation of the sound or sound field, wherein the two or more hierarchical enhancement layers comprises a highest usable hierarchical enhancement layer, and wherein each of the two or more hierarchical enhancement layers include a portion of the enhancement side information including parameters for improving a basic reconstructed sound representation obtainable from data included in a respective layer and any layers lower than the respective layer;

determining that a parameter CodedVVecLength is equal to 1, and based on this determination, determining that particular components of a vector corresponding to the compressed HOA representation are implicitly set to zero; and decoding the compressed HOA representation based on the basic side information that is associated with the base layer and based on the portion of the enhancement side information that is associated with the highest usable hierarchical enhancement layer, and not based on a second portion of the enhancement side information that is associated with any other layer of the two or more hierarchical enhancement layers.

2. The method of claim 1, wherein the base layer includes at least one portion of additional basic side information corresponding to the respective layer and including information that specifies decoding of one or more components among the components assigned to the respective layer in dependence on other components assigned to the respective layer and any layers lower than the respective layer, the method comprising, for each portion of additional basic side information:

decoding the portion of additional basic side information by referring to the components assigned to its respective layer and any layers lower than the respective layer; and correcting the portion of additional basic side information by referring to the components assigned to the highest usable hierarchical enhancement layer and any layers between the highest usable hierarchical enhancement layer and the respective layer, wherein the basic reconstructed sound representation is obtained from the components assigned to the highest usable hierarchical enhancement layer and any layers lower than the highest usable hierarchical enhancement layer, using the basic side information and corrected portions of additional basic side information obtained from portions of additional basic side information corresponding to layers up to the highest usable hierarchical enhancement layer.

3. A non-transitory carrier medium carrying computer executable code that, when executed on a processor, causes the processor to perform a method according to claim 1.

4. An apparatus for decoding a compressed Higher Order Ambisonics (HOA) representation of a sound or sound field, the apparatus comprising:

a receiver for receiving a bit stream containing the compressed HOA representation, wherein the bit stream comprises a plurality of hierarchical layers that include a base layer and two or more hierarchical enhancement layers, wherein the bit stream comprises at least a data payload corresponding to the plurality of hierarchical layers, and wherein the bit stream further comprises basic side information that is associated with the base layer and enhancement side information that is associated with the two or more hierarchical enhancement layers, wherein the plurality of hierarchical layers have assigned thereto components of the compressed HOA representation of the sound or sound field, wherein the two or more hierarchical enhancement layers comprises a highest usable hierarchical enhancement layer, and wherein each of the two or more hierarchical enhancement layers include a portion of the enhancement side information including parameters for improving a basic reconstructed sound representation obtainable from data included in a respective layer and any layers lower than the respective layer; and a processor for determining that a parameter CodedVVecLength is equal to 1, and based on this determination, determining that particular components of a vector corresponding to the compressed HOA representation are implicitly set to zero; and a decoder for decoding the compressed HOA representation based on the basic side information that is associated with the base layer and based on the portion of the enhancement side information that is associated with the highest usable hierarchical enhancement layer, and not based on a second portion of the enhancement side information that is associated with any other layer of the two or more hierarchical enhancement layers.

* * * * *